United States Patent [19]
Gorres

[11] 3,716,250
[45] Feb. 13, 1973

[54] BOGIE AXLE

[76] Inventor: Thomas J. Gorres, Benson, Minn. 56215

[22] Filed: March 1, 1971

[21] Appl. No.: 119,553

[52] U.S. Cl. ........................ 280/104.5 A, 280/80
[51] Int. Cl. ............................................. B62d 61/00
[58] Field of Search ..................... 280/104.5 A, 80

[56] References Cited

UNITED STATES PATENTS

| 2,124,149 | 7/1938 | Redhead | 280/104.5 A |
| 2,488,002 | 11/1949 | Carraher | 280/104.5 A |

FOREIGN PATENTS OR APPLICATIONS

| 428,452 | 7/1967 | Switzerland | 280/104.5 A |
| 483,626 | 10/1929 | Germany | 280/104.5 A |

Primary Examiner—Philip Goodman
Attorney—Dugger, Peterson, Johnson & Westman

[57] ABSTRACT

The present invention relates to a construction in a bogie or tandem axle of the walking beam type wherein the axis of pivoting of the walking beam is specifically located with respect to the axes of the wheels being supported to minimize bouncing of the walking beam, improve towing characteristics, and to develop improved flotation characteristics over conventional walking beam systems.

2 Claims, 2 Drawing Figures

PATENTED FEB 13 1973 3,716,250

INVENTOR.
THOMAS J. GORRES
BY
Dugger, Peterson, Johnson & Westman
ATTORNEYS

BOGIE AXLE

BACKGROUND OF THE INVENTION

1. Field of the Invention

The present invention relates to mounting systems for walking beams or bogie axles.

2. Prior Art

Various types of walking beams or bogie axles have been utilized wherein the pivoting of the walking beam itself is displaced from the geometrical center between the axes of the wheels which are supported on the walking beam. For example, U.S. Pat. No. 2,754,132 shows the positioning of the pivot for the walking beam below the plane defined by the wheel axles. Also, U.S. Pat. No. 2,017,001 shows the pivoting of a walking beam or a bogie axle forwardly from the midpoint between the two spindles for the wheels supported on the walking beam. U.S. Pat. No. 2,999,695 also shows the pivot point for the walking beam below the plane defined by the main axles of the wheels supported on the assembly. U.S. Pat. Nos. 1,857,234 and 1,840,155 show positioning of the pivot point for a bogie axle above the plane defined by the axles of the wheels, and also forwardly from the midpoint between the wheels.

The position of the pivot point for walking beams thus has been in many locations, but the optimum location such as that disclosed herein has not been shown in the prior art, and has totally escaped people skilled in the art.

SUMMARY OF THE INVENTION

The present invention relates to the mounting of a bogie or tandem axle on a walking beam to a trailer body or the like wherein the pivot point for the walking beam is specifically located below a plane defined by the axis of rotation of the wheels supported on the walking beam, and rearwardly of the midpoint between the wheels, when viewed in the direction of normal pulling of the vehicle.

The mounting or support means can be of any desired configuration, but the positioning of the pivot axis of the walking beam is specifically located.

DESCRIPTION OF THE PREFERRED EMBODIMENT

Figure 2:
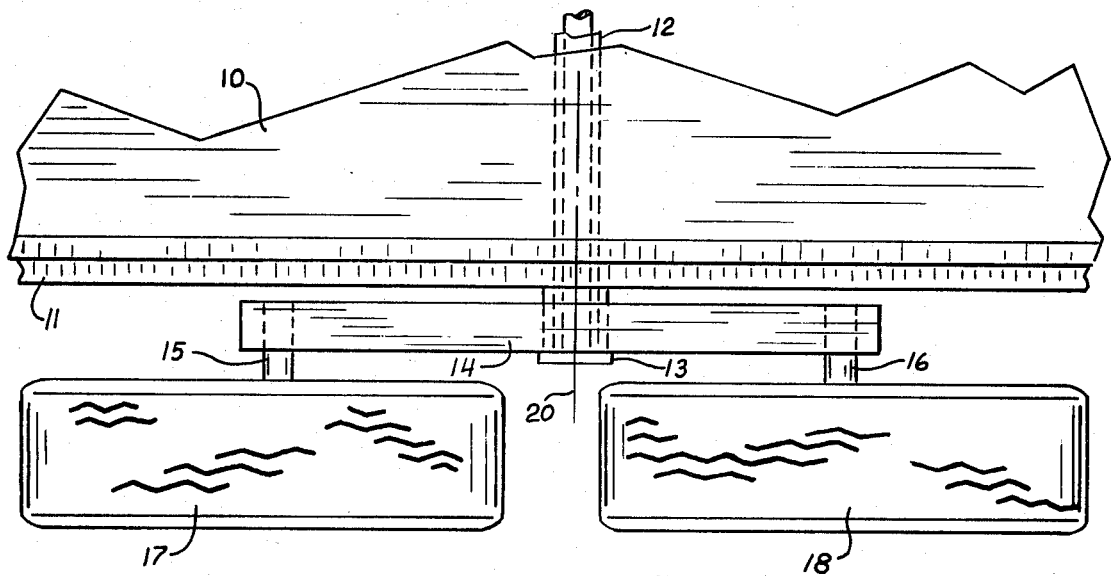
FIG. 2 is a top plan view of the device of FIG. 1 with parts broken away.
Figure 1:
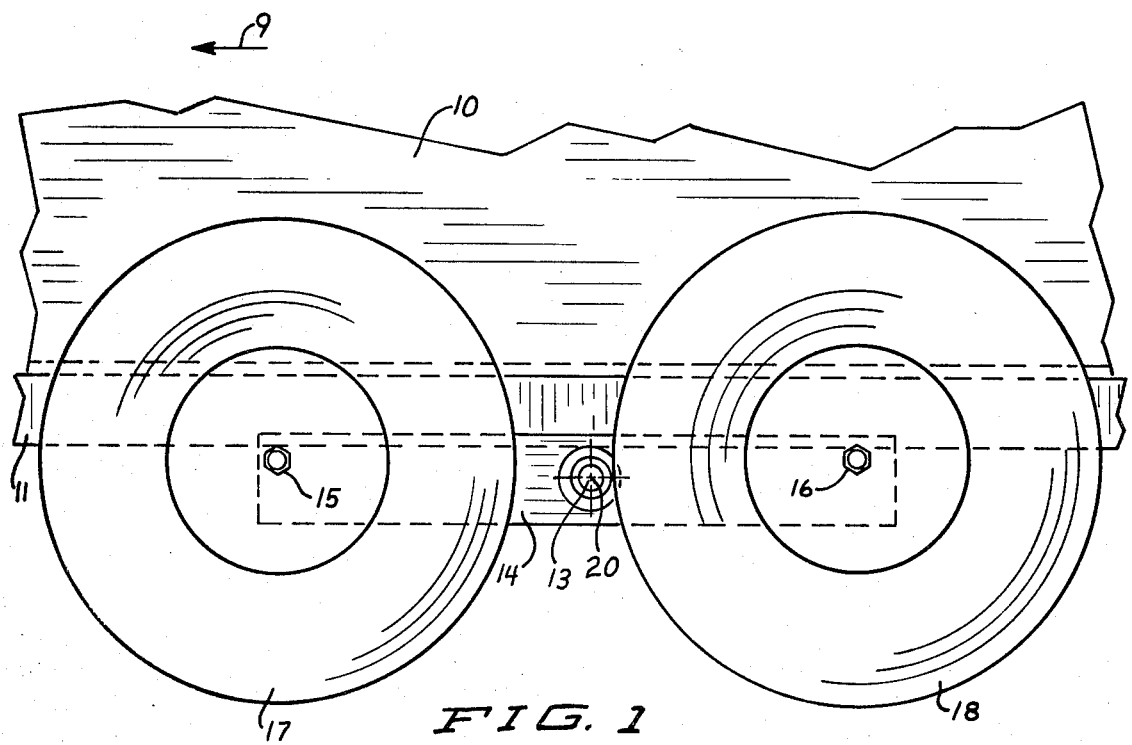
FIG. 1 is a side elevational view of a bogie axle set up illustrating the mounting made according to the present invention.

In FIG. 1, there is shown a trailer assembly 10, which is pulled through its conventional hitch pole or tongue assembly in direction indicated by the arrow 9, and is mounted with a pair of bogie axles, one on each side of the trailer unit. While only one side of the unit is shown, it is to be understood that the mounting is a mirror image of this side on the opposite side of the trailer. In other words there are two bogie axles, one on each side of the trailer body itself. The trailer 10 includes a bed or frame 11, that is used to mount a bearing or support tube 12 into which a shaft 13 is rotatably mounted. The shaft 13 in turn supports a walking beam 14. The walking beam 14 can be a rectilinear cross sectional tubular member as shown that is of conventional design. At opposite ends of the walking beam, there are mounted wheel spindles 15 and 16, respectively. A front wheel 17 is mounted on the spindle 15, and a rear wheel 18 is mounted onto the spindle 16. The wheels 17 and 18 are used of course for supporting the trailer body, and they are rotatably mounted onto their respective spindles 15 and 16.

The axis of pin 13, which is indicated at 20, is selected so that it is below a plane defined by the axes of rotation of the wheels 17 and 18, and is to the rear of a midpoint in fore and aft direction between these axes. This specific positioning of the axis of rotation of the walking beam, which is directly pivotally mounted onto the trailer frame. This positioning of the axis of the walking beam to the rear and below the center point between the wheel spindles dampens out any bouncing of the wheels 17 and 18 as the trailer is moved along in direction as indicated by the arrow 9. The forward wheel 17 carries a smaller portion of the trailer weight so that the leading wheel does not tend to dig in as much in soft fields, and rides higher when the trailer is loaded. This means that when the trailer body is used for a fertilizer spreader trailer for inorganic fertilizer, which is the primary usage for this type of walking beam axle, there is less problem in draft, and the overall operation is greatly improved. The lower weight of the front spindles of the walking beam improves the flotation characteristics, and also in turning a walking beam or bogie axle trailer, the lighter weight on the front spindles puts less load on the front spindles during turning.

The device is easy to manufacture, and greatly improves the performance of towed trailers.

What is claimed is:

1. In a trailer including a frame member, a walking beam support member for said trailer, said walking beam including wheel means comprising front and rear wheel means with respect to a normal direction of movement of said trailer, said walking beam member including a unitary body, front and rear spindle members mounted to said body, said front and rear wheel means being rotatably mounted on said spindle members, respectively, and pivot pin means to pivotally mount said walking beam to said trailer frame member, the pivotal axis of said pivot pin means being below a substantially horizontal plane defined by the axes of said spindles, and rearwardly of the midpoint between the axes of said spindles in fore and aft direction whereby the tendency of said wheel means to bounce is dampened, and the front wheel means carry a smaller portion of the trailer weight than the rear wheel means.

2. The combination specified in claim 1 wherein said walking beam comprises a rectilinear cross section member, and said pin passes through said rectilinear cross section member to directly pivotally mount the walking beam to said trailer frame.

* * * * *